United States Patent [19]
John, Jr.

[11] 4,116,767

[45] Sep. 26, 1978

[54] FLUID PRESSURE APPARATUS FOR RECOVERING FUEL PELLETS FROM NUCLEAR FUEL ELEMENTS

[75] Inventor: Clarence D. John, Jr., Penn Hills, Pa.

[73] Assignee: Westinghouse Electric Corp., Pittsburgh, Pa.

[21] Appl. No.: 749,869

[22] Filed: Dec. 13, 1976

[51] Int. Cl.² .................................................. G21C 19/26
[52] U.S. Cl. ........................................ 176/87; 176/30; 29/427
[58] Field of Search ........................ 176/30, 87; 29/427

[56] References Cited

U.S. PATENT DOCUMENTS

| | | | |
|---|---|---|---|
| 3,173,844 | 3/1965 | Jones | 176/30 |
| 3,293,734 | 12/1966 | Buckley | 29/427 X |
| 3,914,848 | 10/1975 | Bagby | 29/427 |
| 3,990,591 | 11/1976 | Street et al. | 176/30 X |
| 4,030,973 | 6/1977 | Hoffmeister et al. | 176/30 X |

Primary Examiner—Peter A. Nelson
Attorney, Agent, or Firm—L. A. DePaul; Z. L. Dermer

[57] ABSTRACT

Apparatus for removing fuel pellets from a nuclear fuel element without damaging the fuel pellets or fuel element sheath so that both may be reused. The apparatus comprises devices for holding the fuel element while a high pressure stream internally pressurizes the fuel element to expand the fuel element sheath away from the fuel pellets therein so that the fuel pellets may be easily removed.

6 Claims, 5 Drawing Figures

4,116,767

FLUID PRESSURE APPARATUS FOR RECOVERING FUEL PELLETS FROM NUCLEAR FUEL ELEMENTS

BACKGROUND OF THE INVENTION

This invention relates to apparatus for removing fuel pellets from nuclear fuel elements and particularly to such apparatus utilizing internal pressurization of the fuel element.

In many designs of nuclear reactors, the reactor vessel has an inlet and an outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound, is stacked within the metallic sheath. During reactor operation, the nuclear fuel pellets fission releasing fission products such as fission gas while generating heat in a manner well known in the art.

During the manufacture of such fuel element it is necessary to stack the fuel pellets in the metallic sheath and seal the end thereof. Occasionally during this process a defect in the sheath, the stacking process or the fuel pellets may be discovered which would necessitate the scrapping of the particular fuel element. When a defective fuel element is so scrapped, it is a common practice to attempt to salvage as much of the fuel element as is possible. Since the fuel pellets are tightly contained within the metallic sheath, the methods of salvaging the fuel element have historically employed destructive means to remove the fuel pellets. For example, it is known in the prior art to salvage part of the fuel pellets by sectioning the metallic sheath and crushing the fuel pellets. It is also known to use lasers or machine tools to cut the metallic sheath open lengthwise and remove the fuel pellets. However, these techniques cause some of the fuel pellets and the metallic sheath to be damaged or contaminated with foreign material which resulted in a low percentage of recovery of nuclear fuel and the total destruction of the metallic sheaths.

In G.B. Pat. No. 1,097,597 to Guneratne et al there is described a method to remove metallic sheaths from nuclear fuel elements by applying a high frequency alternating electric current to the sheath so that the temperature of the sheath is raised relative to that of the fuel therein. Raising the temperature of the sheath causes the sheath to soften and expand so that the sheath may be removed by ultrasonic means or flexibly mounted scrapers or shredders. While this method may increase the salvage fuel pellet percentage, the scrapers or shredders will render the sheath unusable. Furthermore, Guneratne suggests that the alternating current be applied while the shredders are engaged, which would increase the complexity of the apparatus involved.

In addition to these concepts, fluid pressure has been employed to mold metal casings into a particular shape, but not to remove fuel pellets from a fuel element.

SUMMARY OF THE INVENTION

Apparatus for removing fuel pellets from a nuclear fuel element without damaging the fuel pellet or metallic sheath so that both may be reused. The apparatus comprises a member wherein the fuel element may be removably mounted and arranged so that a high pessure stream may internally pressurize the fuel element thereby expanding the fuel element's metallic sheath away from the fuel pellets therein so that the fuel pellets may be easily removed. A split tube die is also provided to enclose the fuel element during pressurization to thereby limit the expansion of the metallic sheath to within predetermined limits.

It is an object of this invention to provide apparatus for internally pressurizing a fuel element to expand the fuel element's metallic sheath away from the fuel pellets therein thus enabling the easy removal of the fuel pellets.

It is a particular object of this invention to provide apparatus for injecting water at a high pressure into a fuel element to expand the fuel element's metallic sheath away from the fuel pellets therein thus enabling the easy removal of the fuel pellets.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

Occasionally during the assembly of fuel elements such as when fuel pellets are stacked in the fuel element metallic sheath, defects result that require the dismantling of the particular fuel element. Under such circumstances, it is important to salvage as much of the component parts as is possible. The invention described herein provides a method and apparatus for removing fuel pellets from a fuel element metallic sheath without damaging the fuel pellets or the metallic sheath.

Figure 1:
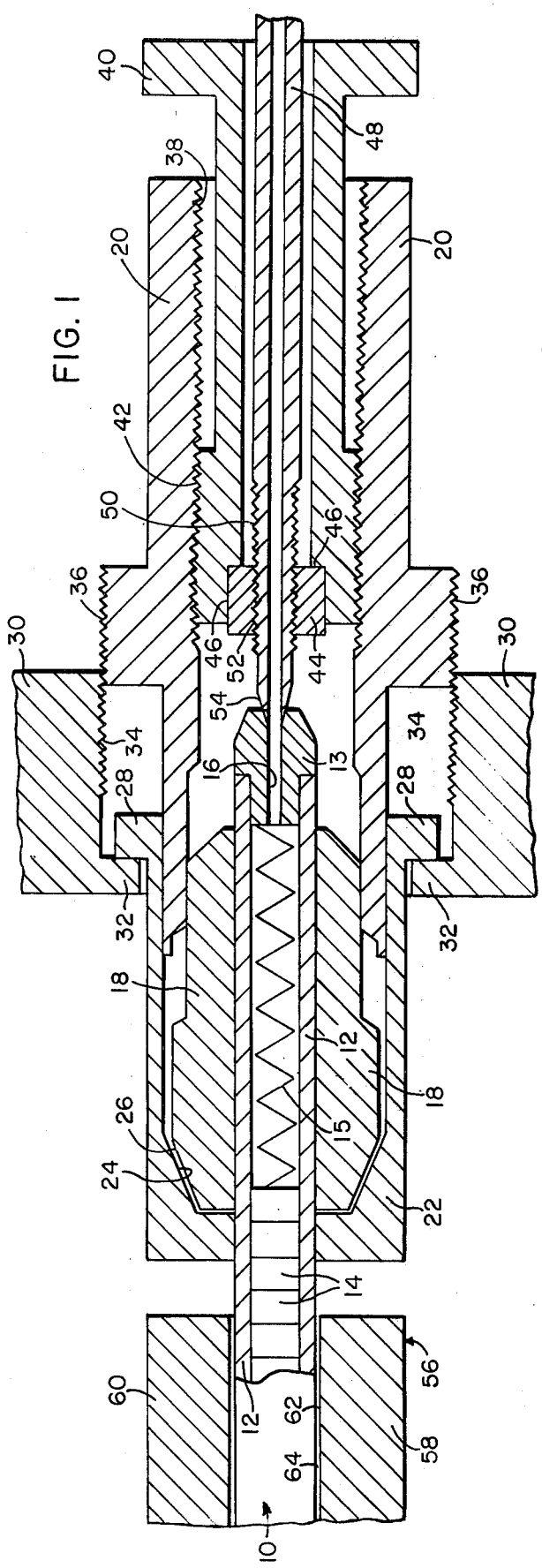
FIG. 1 is a longitudinal cross-sectional view of the fuel element assembly in an open position.

Referring to FIG. 1, a fuel element referred to generally by 10 comprises a metallic sheath 12, an end plug 13 disposed in the end of metallic sheath 12, and fuel pellets 14 stacked within metallic sheath 12. A spring 15 may be disposed between pellets 14 and end plug 13 so as to support fuel pellets 14 and provide a space for the accumulation of fission gas. The metallic sheath 12 and end plug 13 may be manufactured from zirconium or other common fuel element material and fuel pellets 14 may be ceramic pellets of a uranium compound. Before being mounted, a tapered hole 16 is drilled in end plug 13 by means well known in the art so as to provide a tapered opening in that end of the metallic sheath 12. Fuel element 10 is then slid into collet 18 so that the end of metallic sheath 12 with end plug 13 having hole 16 therein extends beyond collet 18. Collet 18 may have a cylindrical inner surface that conforms to the outer surface of metallic sheath 12 and may have an outer surface conforming to the surface of adjacent members.

Figure 3:
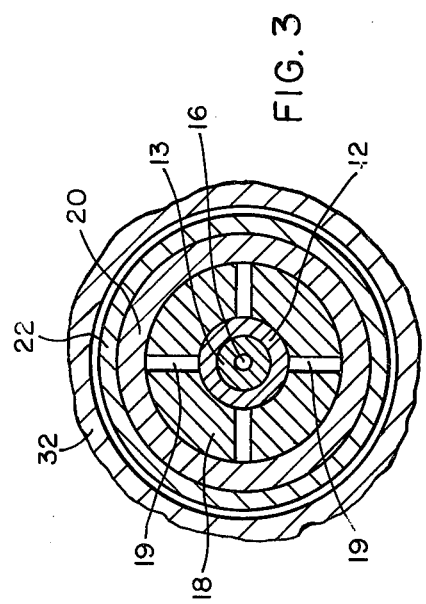
FIG. 3 is a cross-sectional view along line III—III of FIG. 2.
Figures 2, 5:
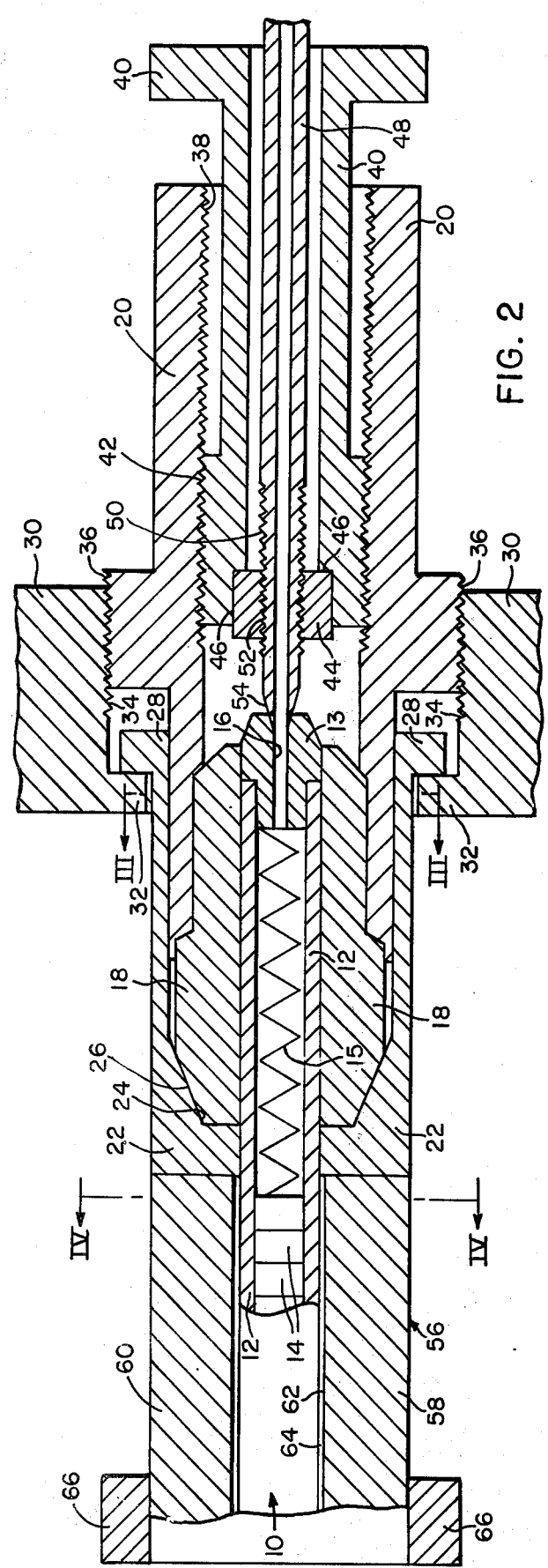
FIG. 2 is a longitudinal cross-sectional view of the fuel element assembly in a closed position.
FIG. 5 is a longitudinal cross-sectional view of an alternate arrangement.

Collet 18 also has longitudinal grooves 19 (as shown in FIG. 3) that extend from its inner surface to its outer surface that allow collet 18 to be flexible. Collet 18 may be manufactured from common materials and formed in the configuration as shown in the drawings. Collet 18 has its front end disposed in a conforming substantially cylindrical body 20 while a collet closing sleeve 22 having an inner face 24 conforming to the outer side 26 of collet 18 is disposed around collet 18. Collet closing sleeve 22 has a flange 28 near its front end. A collet hand nut 30 having a collet hand nut flange 32 is arranged around collet closing sleeve 22 such that collet hand nut flange 32 is adjacent flange 28. Collet hand nut 30 has first threads 34 that conform to second threads 36 of body 20. First threads 34 in conjunction with second threads 36 provide a mechanism whereby turning collet hand nut 30 about the longitudinal axis of body 20 will cause collet hand nut flange 32 to engage flange 28 thereby drawing inner face 24 against outer side 26. Further turning of collet hand nut 30 will cause collet closing sleeve 22 to force collet 18 into close contact with body 20 and metallic sheath 12 thereby holding fuel element 10 firmly in place as shown in FIG. 2. Longitudinal grooves 19 provide collet 18 with the flexibility necessary to fit tightly into body 20 while holding fuel element 10 in place.

Again referring to FIG. 1, body 20 has inner threads 38 disposed along its inner side. A jamb nut 40 having outer threads 42 complementary to inner threads 38 is disposed within body 20. Inner threads 38 and outer threads 42 form a right-hand screw joint as is well understood in the art. Sleeve 44 which is a cylindrical metal ring is disposed in counter bore 46 of jamb nut 40. A high pressure tube 48 is disposed through jamb nut 40 and has third threads 50 that conform to fourth threads 52 of sleeve 44 so as to form a left-hand screw joint. High pressure tube 48 has its front end formed into a nozzle 54 that conforms to hole 16 in fuel element 10. As an alternate, nozzle 54 may be internally threaded so that it fits over the end of fuel element 10. High pressure tube 48 is made of a heavy wall tubing and is attached to a high pressure fluid source such as a water source that is capable of developing pressure in excess of 16,000 psi. Jamb nut 40 may be advanced by turning it in a typical right-hand screw motion which causes the high pressure tube 48 to be advanced toward and firmly seated against fuel element 10. A split die 56 comprising a lower half 58 and an upper half 60 is arranged around fuel element 10 and adjacent to collet closing sleeve 22. Both lower half 58 and upper half 60 have a groove 62 therein that substantially conforms to the outer side of metallic sheath 12. A small clearance 64 of approximately 0.014 inches is provided along groove 62 between lower half 58 and metallic sheath 12 and between upper half 60 and metallic sheath 12. When metallic sheath 12 is internally pressurized, metallic sheath 12 expands into contact with lower half 58 and upper half 60 thereby eliminating clearance 64. The size of clearance 64 may be chosen so as to limit the expansion of metallic sheath 12 to within acceptable limits to enable the reuse of metallic sheath 12. A clamping mechanism 66 is provided around split die 56 to hold lower half 58 and upper half 60 together during the pressurization of metallic sheath 12. Not only does split die 56 allow for a controlled expansion of metallic sheath 12 but it also provides protection of the surroundings against any violent expansion of metallic sheath 12.

OPERATION

Figure 4:
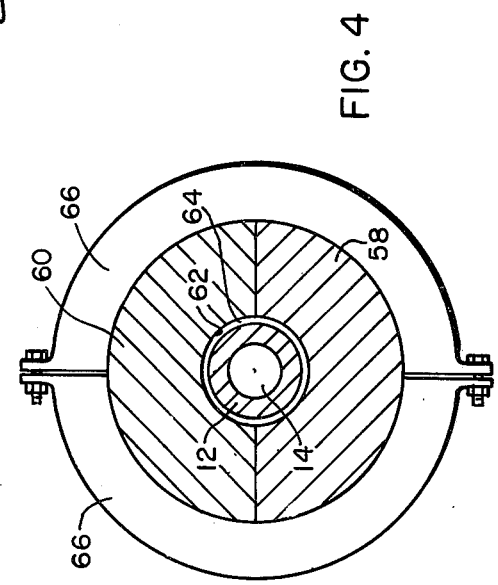
FIG. 4 is a cross-sectional view along line IV—IV of FIG. 2.

In order to remove fuel pellets 14 from metallic sheath 12, a hole 16 is first drilled in end plug 13 by common means. Fuel element 10 is then placed in collet 18 as shown in FIG. 1. Once fuel element 10 is placed in collet 18, collet hand nut 30 is then rotated about body 20 in a right-hand screw motion which causes collet hand nut flange 32 to advance and contact flange 28. With collet hand nut flange 32 in contact with flange 28, collet hand nut 30 is further rotated which causes collet hand nut flange 32 to draw flange 28 in the direction of the advancing collet hand nut 30. The motion of flange 28 causes collet closing sleeve 22 to advance in the direction of collet 18 which causes inner face 24 to contact outer side 26. Collet closing sleeve 22 thus contacts collet 18 and forces collet 18 tightly into body 20 and forces collet 18 tightly around fuel element 10 thereby holding fuel element 10 in a stationary position as shown in FIG. 2. Longitudinal grooves 19 provide collet 18 with the flexibility necessary to conform to body 20 when so forced therein. Split die 56 is then positioned around the portion of fuel element 10 that extends beyond collet closing sleeve 22. Lower half 58 is placed under fuel element 10 and in abutting relationship to collet closing sleeve 22 while upper half 60 is similarly placed above fuel element 10. When in this position, lower half 58 and upper half 60 are in contact with each other while a clearance 64 separates them from fuel element 10 as shown in FIG. 4. Clamping mechanism 66 is then tightened around split die 56 thereby holding lower half 58 in close contact with upper half 60. High pressure tube 48 is slid toward fuel element 10 which causes sleeve 44 to slide forward relative to counter bore 46 until nozzle 54 is positioned in hole 16. While in this position, jamb nut 40 is rotated in a right-hand screw motion which causes jamb nut 40 to advance toward fuel element 10 which in turn causes counter bore 46 to contact sleeve 44. Further rotation of jamb nut 40 together with frictional resistance between sleeve 44 and counter bore 46 causes high pressure tube 48 to be further advanced toward fuel element 10 thus increasing the contact between nozzles 54 and end plug 13. When in this position, a high pressure stream of water is conducted through high pressure tube 48, through hole 16, and into contact with fuel pellets 14 and the inside of metallic sheath 12. The pressure inside metallic sheath 12 is allowed to build up to approximately 16,000 psi so that the metallic sheath 12 expands beyond its elastic yield limit, thereby permanently expanding metallic sheath 12 away from fuel pellets 14. Under these conditions collet 18, collet closing sleeve 22 and split die 56 serve to control and limit such expansion of metallic sheath 12 so that metallic sheath 12 does not fail under such pressure. Water is used as the pressurizing medium because it does not have a high stored energy as does a gas which thereby reduces the possibility of an uncontrolled expansion of metallic sheath 12. Furthermore, since water does not damage most nuclear fuel pellet materials, the fuel pellets 14 that come into contact with the water are not adversely affected thereby and may be reused without alteration. Once metallic sheath 12 has been so permanently expanded, the high pressure water is relieved by draining high pressure tube 48 and fuel element 10 is removed from the assembly in a reverse manner to which it was placed therein. When removed from the assembly, one end of fuel element 10 is removed such as by a cutting process so that spring 15 may be removed and fuel pellets 14 exposed. Fuel element 10 may then be tilted so that fuel pellets 14 may slide out. Because collet 18 tightly holds fuel element 10 therein, the portion of metallic sheath 12 in contact with collet 18 is not expanded. This non-expanded portion is normally the portion of fuel element 10 in which spring 15 is disposed so that this non-expanded portion may be removed by cutting metallic sheath 12 without contacting fuel pellets 14. Alternatively, collet 18 may be less tightly fitted around metallic sheath 12 so that when metallic sheath 12 is pressurized collet 18 may expand by an amount corresponding to the width of clearance 64, thereby uniformly expanding the entire metallic sheath 12. When the entire metallic sheath 12 is so expanded, then only end plug 13 need be removed to expose spring 15 and fuel pellets 14. The expansion of metallic sheath 12 due to the internal pressurization allows the fuel pellets 14 to slide out of metallic sheath 12 in a condition to be reused without further processing. Moreover, if the expansion of the metallic sheath 12 is properly limited, such as by constructing groove 62 so as to limit clearance 64, the metallic sheath 12 may also be reused by simply modifying the end which was opened to remove the fuel pellets. For example, such a modification may merely entail the welding of a new end plug to the metallic sheath 12. The invention, therefore, provides apparatus for internally pressurizing a fuel element to expand the fuel element's metallic sheath away from the fuel pellets therein, thus enabling the easy removal of the fuel pellets.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, one modification is shown in FIG. 5. In this embodiment sleeve 44 is attached to high pressure tube 48 by welds 68 and jamb nut 40 is eliminated such that sleeve 44 directly contacts body 20. In addition, nozzle 54 is modified as shown in FIG. 5 and seals 70 which may be O-rings are added. As shown, end plug 13 of fuel element 10 is removed so that high pressure tube 48 may be inserted therein while seals 70 provide a sealing mechanism for containing the high pressure water that is used to expand the metallic sheath 12. Once metallic sheath 12 has been expanded and removed from the assembly, fuel pellets 14 can be easily spilled out through the same end through which the high pressure tube 48 was inserted.

As a further modification, the configuration as shown in FIG. 2 may be arranged vertically so that the split die 56 is near the bottom of the assembly. In this configuration the end of fuel element 10 near the bottom may be removed in addition to hole 16 being drilled in the top thereof so that when fuel element 10 is pressurized, the fuel pellets 14 may drop out the bottom end. Also, a vibratory mechanism may be employed that would vibrate fuel element 10 and enhance the removal of the fuel pellets.

In addition, the movement of the parts such as collet hand nut 30, jamb nut 40, high pressure tube 48, split die 56, and fuel element 10, may be controlled either manually or mechanically by using common mechanisms.

I claim as my invention:

1. Apparatus for removing nuclear fuel pellets from nuclear fuel elements comprising:
   collet means for supporting a fuel element and for limiting the expansion of the metallic sheath of said fuel element;
   a high pressure tube arranged in colinear alignment with said fuel element for conducting water into said fuel element thereby pressurizing said fuel element, thus expanding said metallic sheath away from said fuel pellets and enabling the easy removal of said fuel pellets;
   a body disposed about said collet means for manipulating said collet means; and
   a jamb nut movably disposed within said body for manipulating said high pressure tube into contact with said fuel element.

2. The apparatus according to claim 1 wherein said apparatus further comprises:
   a split die having two separable halves disposed around the portion of said fuel element extending beyond said collet means for limiting the expansion of said metallic sheath; and
   clamping means disposed around said split die for holding said two halves together.

3. The apparatus according to claim 2 wherein said high pressure tube has seals disposed therearound for maintaining said internal pressurization of said fuel element.

4. Apparatus for removing nuclear fuel pellets from the metallic sheath of nuclear fuel elements comprising:
   a collet having longitudinal grooves therein for providing flexibility and having a center bore for accommodating said fuel element;
   a body disposed about said collet for supporting said collet and said fuel element;
   a collet closing mechanism disposed on said body and around said collet for forcing said collet into close contact with said metallic sheath thereby holding said metallich sheath firmly in place;
   a high pressure tube arranged in colinear alignment with said fuel element and in fluid communication with the interior of said metallic sheath for conducting water at a high pressure into said fuel element, thus expanding said metallic sheath away from said fuel pellets and enabling the easy removal of said fuel pellets; and
   a jamb nut movably disposed within said body and around said high pressure tube for moving said high pressure tube into contact with said fuel element.

5. The apparatus according to claim 4 wherein said apparatus further comprises:
   a split die having two separable halves disposed around the portion of said fuel element extending beyond said collet for limiting the expansion of said metallic sheath; and
   clamping means disposed around said split die for holding said two halves together.

6. The apparatus according to claim 5 wherein said high pressure tube has seals disposed therearound for maintaining said internal pressurization of said fuel element.

* * * * *